United States Patent [19]

Conner, Sr.

[11] 4,342,596
[45] Aug. 3, 1982

[54] NON-PETROLEUM BASED METAL CORROSION INHIBITOR

[76] Inventor: Alvin J. Conner, Sr., 19 Charlotte Dr., New Orleans, La. 70122

[21] Appl. No.: 253,259

[22] Filed: Apr. 13, 1981

Related U.S. Application Data

[63] Continuation of Ser. No. 138,758, Apr. 10, 1980, abandoned, which is a continuation-in-part of Ser. No. 37,418, May 9, 1979, Pat. No. 4,233,176.

[51] Int. Cl.$^3$ ................................................ C09D 5/08
[52] U.S. Cl. .............................. 106/14.13; 106/14.15; 106/14.18; 106/14.27; 106/14.31; 106/14.42; 252/392; 252/394; 252/396; 428/457
[58] Field of Search ............... 106/14.13, 14.15, 14.18, 106/14.27, 14.31, 14.42; 252/392, 394, 396; 428/457

[56] References Cited

U.S. PATENT DOCUMENTS

| | | | |
|---|---|---|---|
| 2,520,356 | 8/1950 | Bishop | 117/134 |
| 3,378,488 | 4/1968 | Nimerick | 252/8.55 |
| 3,573,225 | 3/1971 | Kondo et al. | 252/392 |
| 3,897,349 | 7/1975 | Marin et al. | 252/392 |
| 3,935,125 | 1/1976 | Jacob | 422/15 |
| 3,977,994 | 8/1976 | Geiser | 252/392 |
| 4,000,079 | 12/1976 | Rasp et al. | 252/75 |
| 4,072,783 | 2/1978 | Yasue et al. | 428/341 |
| 4,074,013 | 2/1978 | Koch et al. | 428/457 |
| 4,113,498 | 9/1978 | Rones et al. | 106/14.13 |
| 4,116,701 | 9/1978 | Conner | 106/14.14 |
| 4,130,524 | 12/1978 | Boerwinkle et al. | 260/29.6 HN |
| 4,131,583 | 12/1978 | Boerwinkle | 260/29.6 HN |
| 4,168,292 | 9/1979 | Redmore et al. | 422/12 |

FOREIGN PATENT DOCUMENTS 1518342  7/1978  United Kingdom .

*Primary Examiner*—Lorenzo B. Hayes
*Attorney, Agent, or Firm*—Armstrong, Nikaido, Marmelstein & Kubovcik

[57] ABSTRACT

A non-petroleum based metal corrosion inhibitor is provided. The inhibitor is a solution of compounds mixed together in particular proportions to form a non-petroleum based coating for preventing, or inhibiting, the oxidation of metals. The solution is prepared from aliphatic monobasic acids, aromatic acids, a lubricant, amines and water. A coating of the solution inhibits oxidation of metal surfaces, provides lubricity and need not be removed from a metal surface prior to painting. A non-petroleum based metal corrosion inhibitor without the lubricant is also provided.

14 Claims, No Drawings

NON-PETROLEUM BASED METAL CORROSION INHIBITOR

This application is a continuation of prior application, Ser. No. 138,758, filed Apr. 10, 1980 now abandoned, which is a continuation-in-part of prior application, Ser. No. 37,418, filed May 9, 1979; now U.S. Pat. No. 4,233,176.

BACKGROUND OF THE INVENTION

1. Field of the Invention

This invention relates to compositions which inhibit the corrosion or oxidation of metal surfaces. More particularly, this invention relates to a non-petroleum based metal corrosion inhibitor.

2. Description of the Prior Art

Metal industries and, particularly, the steel industry are plagued with the problem of corrosion, e.g., rusting, of metal products, especially sheet products. With the more refined methods of producing higher grade steel sheets for use in automobiles, appliances and allied industries, the problem of rusting during the manufacturing process, storage and shipment has become a significant one.

Various means have been and are being employed to combat this problem. Inhibited petroleum based oils are widely used as coatings for inhibiting the corrosion of various steels. This type of protection, however, is becoming increasingly impractical due to cost, the hazardous conditions created by the use of the petroleum based coatings, difficulty in removing the coatings and difficulty in disposing of the oil following its removal from the steel. Additionally, so-called smudging is sometimes caused by the polymerization and oxidation of petroleum based inhibitor compositions. Since the surface of steel is microscopically porous, sufficient oil is absorbed into the surface to cause such smudging even after removal of the petroleum based inhibitor. In spite of these problems, these oil coatings continue to be used since they provide the required protection against corrosion and also serve to provide lubrication.

It is an object of the present invention, therefore, to provide a non-petroleum based metal corrosion inhibitor that will provide protection against oxidation and will provide lubricity equivalent or superior to that of petroleum-based inhibitors when applied to metal surfaces but which will not possess the undersirable characteristics of such inhibitors.

This and other objects and advantages of the present invention will become apparent to those skilled in the art from the following summary and description of preferred embodiments of the invention.

SUMMARY OF THE INVENTION

According to the present invention, there is provided a metal corrosion inhibiting composition which is a water-based solution of:

(1) a $C_8$–$C_{20}$ aliphatic monobasic acid;
(2) a lubricant;
(3) an aminoalkylalkanolamine;
(4) an aromatic mono- or polycarboxylic acid; and
(5) an amine which forms a water-soluble salt with the acids.

The composition can be applied to the metals by spraying or rolling.

In a separate embodiment, a metal corrosion inhibiting composition which is a water-based solution of the aliphatic, monobasic acid; the aromatic acid and amines is provided.

The composition according to the present invention is generally prepared as a concentrated aqueous solution containing from about 25 to about 65% by weight of the non-aqueous components. For application to metal surfaces, this concentrate is generally diluted up to about 5 times with water, i.e., 5 parts of water to 1 part of the concentrate. The composition offers protection against oxidation to aluminum, zinc coated or galvanized steel, aluminum coated steel, tin plated steel, stainless steel, high carbon electrical grade steel, cold rolled carbon steel and the like.

DESCRIPTION OF PREFERRED EMBODIMENTS

The non-petroleum based corrosion inhibiting composition according to the present invention, including a preferred composition which contains a minor amount of a petroleum oil, appears to be an aqueous solution of a reaction mixture of the various components. The exact mechanism of the formation of the solution, however, is not known.

Relatively high molecular weight aliphatic, monobasic acids are employed in preparing the non-petroleum based composition according to the present invention. Aliphatic acids having from about 8 to about 20 carbon atoms have been found to be useful in preparing the composition. These acids include fatty acids, both saturated and unsaturated, such as caprylic acid, palmitic acid, stearic acid, oleic acid and linoleic acid and resin acids such as abietic acid and acids isomeric therewith. These acids can be used alone or in combination.

In a preferred embodiment of the invention, a mixture of tall oil fatty acids and rosin, because of its availability and cost and the properties of the resultant corrosion inhibiting composition, is used as the high molecular weight aliphatic acid component of the composition. Such mixtures are obtained as a byproduct of the paper industry from tall oil usually recovered from pine wood "black liquor". Oleic and linoleic acids are the major components of the tall oil fatty acids with acids such as palmitic acid, isostearic acid and stearic acid being present in relatively minor amounts. In a typical mixture of tall oil fatty acids and rosin useful in the present invention, oleic acid and linoleic acid comprise about 45% and 35% by weight, respectively, of the fatty acids. Rosin is mainly comprised of isomeric forms of abietic acid. The rosin can be present in amount of from about 5 to 40% by weight; preferably, 10 to 40% by weight, of the tall oil fatty acid/rosin mixture. Mixtures containing less than about 5% by weight of rosin cannot be used because of problems relating to viscosity. Increased amounts of rosin appear to decrease the viscosity of the corrosion inhibiting composition. Mixtures containing more than about 40% rosin are not economical.

Other mixtures of aliphatic acids such as tallow, the major constituents of which are oleic, palmitic, stearic, myristic and linoleic acids, can also be employed in preparing the nonpetroleum based corrosion inhibiting compositions according to the present invention. The high molecular weight aliphatic, monobasic acid component of the corrosion inhibiting composition is employed in an amount of about 5 to 20 parts by weight based on about 100 parts by weight of the concentrated solution.

The composition according to the present invention typically contains a minor amount of a lubricant which may be either a petroleum or a non-petroleum product. Any of the petroleum oils presently employed in petroleum based corrosion inhibiting compositions for steel are believed to be useful in the present composition. Good results have been obtained using a 100 SSU viscosity petroleum oil. In lieu of a petroleum oil, esters such as butyl stearate, dioctyl sebacate, butyl benzoate, or any of the light alkyl esters with boiling ranges above 350° F. can be used as the lubricant. In a particularly preferred embodiment a petroleum oil is used as the lubricant. To obtain a stable aqueous solution of the composition the amount of lubricant is limited by the amount of the high molecular weight aliphatic acid. More particularly, the lubricant is employed in an amount of from about 10 to 20% of the aliphatic acid, i.e., 0.5 to 4 parts by weight per 100 parts by weight of the concentrated solution. Amounts of greater than about 20% are not completely solubilized in the composition.

In applications where lubrication requirements are not severe, the lubricant can be omitted from the metal corrosion inhibiting compositions. Such compositions will provide coatings which give good corrosion protection and which have a lubricity similar, for example, to soapy water. Such lubricity is believed to result from amine soaps or salts of the aliphatic and aromatic acids employed in the compositions.

The aminoalkylalkanolamine of the metal corrosion inhibiting compositions according to this invention has the following general structural formula:

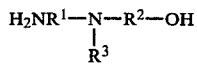

wherein $R^1$ and $R^2$ are independently alkylidene of 1–4 carbon atoms and $R^3$ is hydrogen or alkyl of 1–4 carbon atoms. One or more of these aminoalkylalkanolamines can be employed in the non-petroleum based inhibitor composition according to the present invention. Aminoethylethanolamine is presently preferred because of its cost and the good results that it provides. The specific use of the aminoalkylalkanolamine appears to be important to obtaining a stable lubricant-containing composition which is completely clear, will not stratify or separate and which can be diluted up to about 5 times its weight with water. The amount of the aminoalkylalkanolamine typically employed is 0.5 to 4 parts by weight per 100 parts by weight of the concentrated solution. Greater amounts are not required for stability and are not warranted from the standpoint of cost.

Where a lubricant is omitted from the metal corrosion inhibiting composition, the specific use of the aminoalkylalkanolamine does not appear to be required to obtain clear, stable solutions which provide good corrosion inhibiting coatings.

The metal corrosion inhibiting composition according to the present invention includes as a corrosion inhibitor a water-soluble amine salt of an aromatic acid. As the aromatic acid there may be employed an aromatic monocarboxylic acid such as benzoic acid or an aromatic polycarboxylic acid such as phthalic, isophthalic, terephthalic or trimellitic acid. Mixtures of the aromatic acids may also be employed. Although it has not been confirmed, it is believed that the aromatic acids may also contain other functional groups such as hydroxy and lower alkyl groups which do not inhibit the formation of the water-soluble salt. Good corrosion inhibiting effects have been obtained employing about 10 to 35 parts and, particularly, 24 to 35 parts of the aromatic acid per 100 parts by weight of the concentrated solution.

Virtually any primary, secondary, tertiary or cyclic amine which forms the water-soluble salt with the aromatic acid can be used in the composition according to the present invention to provide corrosion inhibiting properties. Particularly good results have been obtained with the use of (lower $C_2$–$C_4$ alkanol)amines and, particularly, monoethanolamine and diethanolamine. Other suitable amines are triethanolamine, diisopropylamine, cyclohexylamine and morpholine. The amines can be used alone or in combination. The amines employed in the metal-corrosion inhibiting composition according to the present invention also serve to neutralize the aliphatic acid and appear to assist in the solubilization of the lubricant component. The total amount of amines employed in the composition, including the amount of aminoalkylalkanolamine, therefore, is generally in slight excess of the amount required to neutralize, i.e., form salts with, the aliphatic and aromatic acids. Depending on the amounts of the aliphatic and aromatic acids employed, this amount of the amine component is typically within the range of 5 to 25 parts by weight per 100 parts by weight of the concentrated solution. In preferred embodiments the amount is within the range of 15 to 20 parts by weight per 100 parts by weight of the concentrate.

Although the total amount of the high molecular weight aliphatic monobasic acid, lubricant, aromatic acid and salt-forming amines can vary within the ranges described above, for practical use as a concentrate, the non-aqueous components of the compositions are employed in an amount of from 25 to 65 parts per 100 parts by weight of the concentrate. In particularly preferred compositions, the non-aqueous components are employed in an amount of from 55 to 65 parts per 100 parts by weight of the concentrate; the remainder of the concentrate being water. To facilitate application of the corrosion inhibiting compositions to the metal surfaces, the concentrated solutions are diluted up to 5 times, preferably about 4 times, with water, i.e., up to 500 parts of water per 100 parts of the concentrate.

The sequence of addition of the various components appears to be important to get a finished product which is clear, stable and which can be diluted to produce a stable product for final use.

Generally, the mixture of the above-described aliphatic, monobasic acid component and lubricant are added to water with stirring in a suitable mixing device. This is followed by the addition of the aminoalkylalkanolamine which causes the formation of a cloudy emulsion. An amount of the amine (which forms the water-soluble salt with the aromatic acid) in excess of that required to form a clear solution from the cloudy emulsion is then added followed by the aromatic acid and the remainder of the salt-forming amine. In another variation, a solution of the aromatic acid and salt-forming amine can be added to a solution of the aliphatic acid—lubricant—aminoalkylalkanolamine. A unique characteristic of the present invention is that following these procedures, a lubricant, either natural or synthetic, can be completely solubilized in water when the amounts of the components of the non-petroleum based inhibitor concentration are maintained within the ranges described above.

The preparation of typical 55 gallon batchs of a concentrated solution of the non-petroleum based corrosion inhibitor is described below (approximate weights are in parenthesis):

(1) Pump 30 gallons of water (250 lbs) at 120° F. into tank and agitate. Add 10 gallons of a tall oil fatty acid/rosin mixture (80 lbs) sold under the tradename Unitol-DT-40 by Union Camp and 1 or 2 gallons of 100 SSU viscosity petroleum oil (7–14 lbs). The oil will dissolve in the tall/oil-rosin mixture, but neither the petroleum oil nor the tall oil fatty acid/rosin mixture will dissolve in water. While agitating add one gallon of aminoethylethanolamine (8 lbs). An oil in water emulsion will form. This emulsion is milky and completely opaque. Add 8 gallons of monoethanolamine (64 lbs) and the mixture will become clear and stable. Add 100 pounds of benzoic acid and the mixture will become hazy because of the portion of the benzoic acid which has not been neutralized to a soluble salt. To complete neutralization of the benzoic acid, add more monoethanolamine (or morpholine, cyclohexylamine, etc.) until the solution is completely clear and has a pH of 8.0 to 9.5. Continue mixing for 30 minutes and recheck pH. If pH drops below 8.0, add more monoethanolamine to bring pH to 9.0.

(2) Dump 30 gallons of water (250 lbs) at 110°–120° F. into a tank, add 10 gallons of tall oil fatty acids containing 8–12% rosin acids. While agitating, add one quart of aminoethylethanolamine. The tall oil/rosin mixture will emulsify (solution will be milky). Then add 2½ gallons of diethanolamine and the solution will clear and thicken. While agitating slowly add 45 pounds of terephthalic acid. The solution will remain clear and the viscosity will drop. Dilute up to 55–58 gallons with water and continue agitating until all the terephthalic acid has dissolved. The viscosity of the finished solution at 100° F. will be about the same as a 30 wt commercial grade lubricating oil.

For use at the mills or manufacturing plants, one part of a composition prepared as described above is diluted with up to 5 parts of water and applied as either a rust preventative and/or lubricant. The recommended dilution ratio is 1 part concentrate to about 4 parts water.

Preferred compositions according to the present invention are formed by the sequential addition of the following compounds to 250 lbs (about 30 gallons) of water with stirring (weights are approximate):

|     |     |                                   |             |
| --- | --- | --------------------------------- | ----------- |
|     | (a) | tall oil fatty acids/rosin        | 80 lbs      |
|     | (b) | petroleum oil (100 SSU viscosity) | 7–14 lbs    |
|     | (c) | aminoethylethanolamine            | 8 lbs       |
|     | (d) | monoethanolamine                  | 16 lbs      |
|     | (e) | benzoic acid                      | 150–200 lbs |
|     | (f) | monoethanolamine                  | 75–100 lbs  |
| and |     |                                   |             |
|     | (a) | tall oil fatty acids/rosin        | 40 lbs      |
|     | (b) | petroleum oil                     | 3.5–7 lbs   |
|     | (c) | aminoethylethanolamine            | 41 lbs      |
|     | (d) | monoethanolamine                  | 8 lbs       |
|     | (e) | benzoic acid                      | 150–200 lbs |
|     | (f) | monoethanolamine                  | 50–75 lbs   |
|     | (g) | diethanolamine                    | 43 lbs.     |

The above formulations use only 1 or 2 gallons of petroleum oil per fifty-five gallon batch of concentrate. When the concentrated solution is diluted four to one with water, it acts as a direct replacement for oil and replaces up to 200 gallons of oil for each gallon of oil used in the 200 gallon solution. Actual tests have shown that when used as a replacement for oil, one quart of the solution replaces two gallons of oil, so the overall use of oil by steel mills is reduced considerably.

With the cost of petroleum increasing dramatically, the savings through the use of the compositions described herein are considerable. Also, large quantities of petroleum can be released for more important uses.

Another advantage of this solution over petroleum-based inhibitors is that the petroleum-based compositions must be removed from the steel before it can be painted. When degreasing is performed, chlorinated solvents, such as trichloroethylene or perchloroethylene are used. Both are suspected carcinogens and usage of each is now restricted. EPA and OSHA have severely reduced the permissible limits of these substances in the atmosphere. Degreasing is also expensive. Oil disposal also presents an expensive problem. When washing is exercised to remove the oil, detergents and caustic solutions must be used. The wash water and oil cannot be discharged into the drainage systems.

The composition according to the present invention does not have to be removed from the surface of metals prior to painting in most cases. However, when it must be removed, water will remove it from the surface. The water can be discharged into drains since the solution is biodegradable.

The application of the petroleum-based inhibitor compositions at the mills creates further hazards because for every gallon of oil which is applied, some will drip off and create unsafe working conditions. When the oil is applied to sheets which are coiled, oil is spread throughout the area because of the centrifugal motion of the coiling operation. Solvents are used to clean the work area, which may create additional hazards. These operations are eliminated with the use of the non-petroleum based corrosion inhibiting compositions according to the present invention.

When employed in a steel making operation, the inhibitor composition of the present invention should be applied after pickling and hot roll reduction operations, and prior to cold reduction, because the cleaned pickled sheet is very susceptible to rusting. Reapplication of the composition after the final reduction protects the coils during storage prior to annealing. The composition can be reapplied at the temper mill operation, either on the entry or exit side of the temper mill. When the composition is applied at the entry side, a very fine mist application is desirable so as not to cause problems on the temper mill rolls. The composition is applied at the exit side of the temper mill either as a light or heavy spray. This also applies when the solution is applied at the stretch or shear line.

Tests in a humidity cabinet or on coils stored for two months show that the protection afforded by the non-petroleum based corrosion inhibitor composition of the present invention is as good, or better, than conventional inhibited oils.

EXAMPLES

To illustrate the corrosion inhibiting properties of the nonpetroleum based corrosion inhibitor compositions according to the present invention when applied to steel, the following compositions were prepared according to the general procedures described above. In the compositions, percentages are by weight and the tall oil fatty acids/rosin mixtures employed are commercially available compositions in which the fatty acids are composed primarily of a mixture of oleic and linoleic acids:

| | | | |
|---|---|---|---|
| (1) | (a) | Tall oil fatty acid (TOFA) 60%; rosin 40% | 12-18% |
| | (b) | 100 SSU Vis Petroleum Oil | 2-4% |
| | (c) | Amine mixture: 40% aminoethylethanolamine (AEE), 60% monoethanolamine (MEA) | 5-10% |
| | (d) | Benzoic acid | 10-20% |
| | (e) | Water | 71-48% |
| (2) | (a) | TOFA 60%; rosin 40% | 12-18% |
| | (b) | 100 SSU Sec Petroleum Oil | 2-4% |
| | (c) | Amine mixture: 40% AEE, 50% MEA, 10% morpholine | 5-10% |
| | (d) | Benzoic acid | 10-20% |
| | (e) | Water | 71-48% |
| (3) | (a) | TOFA 70%; rosin 30% | 12-18% |
| | (b) | 100 SSU Sec Petroleum Oil | 2-4% |
| | (c) | Amine mixture: 30% AEE, 70% MEA | 5-10% |
| | (d) | Benzoic acid | 10-20% |
| | (e) | Water | 71-48% |
| (4) | (a) | TOFA 80%; rosin 20% | 12-18% |
| | (b) | 100 SSU Sec Vis Petroleum Oil | 2-4% |
| | (c) | Amine mixture: 30% AEE, 70% MEA | 5-10% |
| | (d) | Benzoic acid | 10-20% |
| | (e) | Water | 71-48% |
| (5) | (a) | Oleic acid 80%; rosin-abietic acid 20% | 12-18% |
| | (b) | 100 SSU Vis Petroleum Oil | 2-4% |
| | (c) | Amine mixture: 30% AEE, cyclohexylamine 70% | 5-10% |
| | (d) | Benzoic acid | 10-20% |
| | (e) | Water | 71-48% |
| (6) | (a) | Caprylic acid 70%; abietic acid 30% | 12-18% |
| | (b) | 100 SSU Sec Vis Petroleum Oil | 2-4% |
| | (c) | 30% AEE, 70% MEA | 5-10% |
| | (d) | Benzoic acid | 10-20% |
| | (e) | Water | 71-48% |
| (7) | (a) | TOFA 80%; rosin 20% | 12-18% |
| | (b) | Butyl Stearate | 2-4% |
| | (c) | 30% AEE, 70% MEA | 5-10% |
| | (d) | Benzoic acid | 10-20% |
| | (e) | Water | 71-48% |
| (8) | (a) | Tallow Fatty Acid | 12-18% |
| | (b) | 100 SSU Sec Vis Petroleum Oil | 2-4% |
| | (c) | 30% AEE, 70% MEA | 5-10% |
| | (d) | Benzoic acid | 10-20% |
| | (e) | Water | 71-48% |
| (9) | (a) | Tallow Fatty Acid 80%; rosin 20% | 12-18% |
| | (b) | 100 SSU Sec Vis Petroleum Oil | 2-4% |
| | (c) | 30% AEE, 70% MEA | 5-10% |
| | (d) | Benzoic acid | 10-20% |
| | (e) | Water | 71-48% |
| (10) | (a) | TOFA 70%; rosin 30% | 12-18% |
| | (b) | 100 SSU Sec Vis Petroleum Oil | 2-4% |
| | (c) | 20% AEE, 80% diethanolamine | 5-10% |
| | (d) | Benzoic acid | 10-20% |
| | (e) | Water | 71-48% |
| (11) | (a) | TOFA 70%; rosin 30% | 12-18% |
| | (b) | 100 SSU Sec Vis Petroleum Oil | 2-4% |
| | (c) | 10% AEE; 90% diethanolamine | 5-10% |
| | (d) | Benzoic acid | 10-20% |
| | (e) | Water | 71-48% |
| (12) | (a) | TOFA 70%; rosin 30% | 12-18% |
| | (b) | 100 SSU Sec Vis Petroleum Oil | 2-4% |
| | (c) | Diethanolamine | 5-10% |
| | (d) | Benzoic acid | 10-20% |
| | (e) | Water | 71-48% |
| (13) | (a) | TOFA 90%; rosin 10% | 12-18% |
| | (b) | Amine mixture: 10% AEE; 90% diethanolamine (DEA) | 5-10% |
| | (c) | Terephthalic acid (TPA) | 10-20% |
| | (d) | Water | 73-52% |
| (14) | (a) | TOFA 90%; rosin 10% | 12-18% |
| | (b) | DEA | 5-10% |
| | (c) | TPA | 10-20% |
| | (d) | Water | 73-52% |
| (15) | (a) | TOFA 90%; rosin 10% | 12-18% |
| | (b) | Amine mixture: 10% AEE: 90% MEA | 5-10% |
| | (c) | Phthalic acid (PA) | 10-20% |
| | (d) | Water | 73-52% |
| (16) | (a) | TOFA 90%; rosin 10% | 12-18% |
| | (b) | MEA | 5-10% |
| | (c) | Isophthalic acid (IPA) | 10-20% |
| | (d) | Water | 73-52% |
| (17) | (a) | Oleic acid | 12-18% |
| | (b) | Triethanolamine (TEA) | 5-10% |
| | (c) | IPA | 10-20% |
| | (d) | Water | 73-52% |
| (18) | (a) | Neodecanoic acid | 12-18% |
| | (b) | Amine mixture: 10% AEE; 90% DEA | 5-10% |
| | (c) | TPA | 10-20% |
| | (d) | Water | 73-52% |
| (19) | (a) | Tallow fatty acid | 12-18% |
| | (b) | 100 SSU Sec Vis Petroleum Oil | 2-4% |
| | (c) | Amine mixture: 30% AEE; 70% MEA | 5-10% |
| | (d) | IPA | 10-20% |
| | (e) | Water | 71-48% |
| (20) | (a) | TOFA 80%; rosin 20% | 12-18% |
| | (b) | Amine mixture: 30% morpholine; 70% diethanolamine | 5-10% |
| | (c) | TPA | 10-20% |
| | (d) | Water | 73-52% |
| (21) | (a) | TOFA 95%; rosin 5% | 5-10% |
| | (b) | Neodecanoic acid | 9-12% |
| | (c) | Amine mixture: 30% morpholine; 70% DEA | 5-10% |
| | (d) | TPA | 10-20% |
| | (e) | Water | 71-48% |

These compositions were evaluated for corrosion inhibiting properties according to the testing procedures described below. Data for other corrosion inhibiting compositions are presented for comparative purposes.

TESTING PROCEDURE

Cold roll dry strips (1¼" wide by 4" long, dry, clean and rust-free) were used as test specimens. A 1/16" hole was punched ⅛" from the top and bottom, and ⅜" from one side. A hook, fabricated from galvanized wire, was used to hang the strips in a humidity cabinet. Each strip was marked for identification by embossing a number with a metal stamp about ¼" below the punched hole. To standardize the test, a strip as described above was dipped 2" in the solution to be tested and suspended by a metal hook with the dipped or coated portion of the strip at the bottom. The strip was allowed to dry or drain for one hour, and the hook transferred to the opposite end of the strip, which was then suspended on a rack in the humidity cabinet. The coated or dipped end was now on top, and the lower, uncoated end of the strip on the bottom. The conditions in the humidity cabinet were maintained at 100° F. and 100% humidity.

Observations of the strip were made every 24 hours. The lower or dry parts of all strips were completely rusted after 24 hours. All tests were run for 120 hours.

The condition of the coated parts were graded as follows:

A. Completely free of rust

B. Slight rusting on the surface, but less than approximately 2%

C. Rust on approximately 5-10% of the area
D. Completely rusted

| SOLUTIONS TESTED | | HOURS IN HUMIDITY CABINET | | | | |
|---|---|---|---|---|---|---|
| | | 24 | 48 | 72 | 96 | 120 |
| Lubricating - Preservative Oil MIL-L-2160A - Gr 2 | | A | A | A | A | A |
| Lubricating - Preservative Oil MIL-L3150 - Gr 2 | | A | A | A | A | A |
| Solvent Cutback MIL-O-16173 - Gr 2 | | A | A | A | A | A |
| Uninhibited - 10 Weight Lubricating Oil | | A | A | A | B | C |
| 10% Solution - Sodium Nitrite 90% Distilled Water | | A | B | B | C | D |
| 10% Solution - Sodium Benzoate 90% Distilled Water | | A | B | C | C | D |
| 10% Ammonium Benzoate 90% Distilled Water | | A | B | C | D | D |
| 10% Sodium Molybdate 90% Distilled Water | | A | B | C | C | D |
| 10% Dicyclohexylamine Benzoate 90% Isopropyl alcohol | | A | A | B | B | C |
| 10% Monoethanolamine Benzoate 90% Distilled Water | | A | A | A | B | B |
| 10% Diethanolamine Benzoate 90% Distilled Water | | A | A | B | B | B |
| Composition No. 1 | 100% | A | A | A | A | A |
| Composition No. 1 | 25% | | | | | |
| Deionized Water | 75% | A | A | A | A | A |
| Composition No. 2 | 25% | | | | | |
| Deionized Water | 75% | A | A | A | A | A |
| Composition No. 3 | 25% | | | | | |
| Deionized Water | 75% | A | A | A | A | A |
| Composition No. 4 | 25% | | | | | |
| Deionized Water | 75% | A | A | A | A | A |
| Composition No. 5 | 25% | | | | | |
| Deionized Water | 75% | A | A | A | A | A |
| Composition No. 6 | 25% | | | | | |
| Deionized Water | 75% | A | A | A | A | A |
| Composition No. 7 | 25% | | | | | |
| Deionized Water | 75% | A | A | A | A | A |
| Composition No. 8 | 25% | | | | | |
| Deionized Water | 75% | A | A | A | A | A |
| Composition No. 9 | 25% | | | | | |
| Deionized Water | 75% | A | A | A | A | A |
| Composition No. 10 | 25% | | | | | |
| Deionized Water | 75% | A | A | A | A | A |
| Composition No. 11 | 25% | | | | | |
| Deionized Water | 75% | A | A | A | A | A |
| Composition No. 12 | 25% | | | | | |
| Deionized Water | 75% | A | A | A | A | A |
| Composition No. 13 | 100% | A | A | A | A | B |
| Composition No. 14 | 100% | A | A | A | B | B |
| Composition No. 15 | 100% | A | A | A | B | B |
| Composition No. 16 | 60% | | | | | |
| Deionized Water | 40% | A | A | A | A | B |
| Composition No. 17 | 80% | | | | | |
| Water | 20% | A | A | A | A | A |
| Composition No. 18 | 100% | A | A | A | A | A |
| Composition No. 19 | 60% | | | | | |
| Water | 40% | A | A | A | A | B |
| Composition No. 20 | 100% | A | A | A | A | B |
| Composition No. 21 | 100% | A | A | A | A | A |

Although the present invention has been described in conjunction with the foregoing preferred embodiments, it is not intended to be limited to these embodiments but, instead, includes all those embodiments within the spirit and scope of the appended claims.

What is claimed is:

1. A non-petroleum based metal corrosion inhibiting composition consisting essentially of a solution of one part by weight of an aqueous concentrate and up to five parts by weight of water, said aqueous concentrate being a reaction mixture solution comprising, per 100 parts by weight of the concentrate:
   (a) 5 to 20 parts by weight of an aliphatic, monobasic acid having from 8 to 20 carbon atoms;
   (b) 0.5 to 4 parts by weight of a lubricant;
   (c) an aminoalkylalkanolamine of the formula:

$$H_2NR^1-N-R^2-OH$$
$$\phantom{H_2NR^1-N-}|$$
$$\phantom{H_2NR^1-N-}R^3$$

where $R^1$ and $R^2$ are independently alkylidene of 1-4 carbon atoms, and $R^3$ is hydrogen or alkyl of 1-4 carbon atoms;
   (d) 10 to 35 parts by weight of an aromatic mono- or polycarboxylic acid; and
   (e) an amine which forms a water soluble salt with the aromatic acid, the amount of amines (c) and (e) being an amount in slight excess of that necessary to neutralize the amounts of the aliphatic and aromatic acids.

2. The composition of claim 1 wherein the amount of the aminoalkylalkanolamine of the concentrate is 0.5 to 4 parts by weight.

3. The composition of claim 1 wherein said aliphatic, monobasic acid is selected from the group consisting of oleic acid, linoleic acid, caprylic acid, palmitic acid, stearic acid, myristic acid, abietic acid and mixtures thereof.

4. The composition of claim 1 wherein the aromatic acid is selected from the group consisting of benzoic acid, phthalic acid, terephthalic acid, isophthalic acid, and trimellitic acid.

5. The composition of claim 1 wherein said lubricant is a petroleum oil or an ester.

6. The composition of claim 5 wherein said lubricant is a 100 SSU viscosity petroleum oil.

7. The composition of claim 1 wherein said amine (e) is selected from the group consisting of alkanolamines, where the alkyl group has 2-4 carbon atoms; cyclohexylamine; diisopropylamine; and morpholine.

8. The composition of claim 1 wherein said aliphatic, monobasic acid is a mixture of tall oil fatty acids and rosin or is tallow.

9. The composition of claim 1 wherein said aminoalkylalkanolamine is aminoethylethanolamine.

10. The composition of any one of claims 1 to 9 wherein the amounts of the components of said aqueous concentrate, per 100 parts by weight of the concentrate, are:
   (a) 5 to 20 parts by weight,
   (b) 0.5 to 4 parts by weight,
   (c) 0.5 to 4 parts by weight,
   (d) 24 to 35 parts by weight, and
   (e) 15 to 20 parts by weight.

11. The composition of claim 1 wherein the total amount of components (a), (b), (c), (d) and (e) of said aqueous concentrate is 25 to 65 parts per 100 parts by weight of concentrate, the remainder being water.

12. The composition of claim 1 wherein the total amount of components (a), (b), (c), (d) and (e) of said aqueous concentrate is 55 to 65 parts per 100 parts by weight of concentrate, the remainder being water.

13. A non-petroleum based metal corrosion inhibiting composition consisting essentially of a solution of one part by weight of an aqueous concentrate and up to five parts by weight of water, said aqueous concentrate being a reaction mixture solution comprising, per 100 parts by weight of the concentrate:
  (a) 5 to 20 parts by weight of an aliphatic, monobasic acid having from 8 to 20 carbon atoms;
  (b) 0 to 4 parts by weight of a lubricant;
  (c) an aminoalkylalkanolamine of the formula:

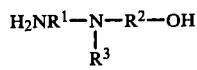

where $R^1$ and $R^2$ are independently alkylidene of 1-4 carbon atoms, and $R^3$ is hydrogen or alkyl of 1-4 carbon atoms;
  (d) 10 to 35 parts by weight of an aromatic mono- or polycarboxylic acid; and
  (e) an amine which forms a water soluble salt which the aromatic acid,
the amount of amines (c) and (e) being an amount in slight excess of that necessary to neutralize the amounts of the aliphatic and aromatic acids.

14. A formed metal object coated with the corrosion inhibiting composition of any one of claims 1-9, 11, 12 or 13.